United States Patent
Preisler et al.

(10) Patent No.: US 8,808,827 B2
(45) Date of Patent: *Aug. 19, 2014

(54) CARGO MANAGEMENT SYSTEM INCLUDING A VEHICLE LOAD FLOOR HAVING A VEHICLE COMPONENT RESTRAINING FEATURE

(71) Applicant: Global IP Holdings, LLC, Sterling Heights, MI (US)

(72) Inventors: Darius J. Preisler, Macomb, MI (US); Christopher A. Heikkila, Washington Township, MI (US)

(73) Assignee: Global IP Holdings, LLC, Sterling Heights, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/762,800

(22) Filed: Feb. 8, 2013

(65) Prior Publication Data

US 2014/0145465 A1    May 29, 2014

Related U.S. Application Data

(63) Continuation-in-part of application No. 13/686,362, filed on Nov. 27, 2012.

(51) Int. Cl.
| | | |
|---|---|---|
| *B62D 25/20* | (2006.01) | |
| *B60R 5/04* | (2006.01) | |
| *B32B 3/26* | (2006.01) | |
| *B23B 3/12* | (2006.01) | |

(52) U.S. Cl.
CPC .............. *B62D 25/20* (2013.01); *B32B 2605/00* (2013.01); *B60R 5/04* (2013.01); *B32B 3/263* (2013.01); *B23B 3/12* (2013.01); *B32B 2262/0253* (2013.01)
USPC .......... 428/95; 296/39.1; 296/39.2; 296/39.3; 296/97.23; 428/98; 428/99; 428/116

(58) Field of Classification Search
CPC .......... A47G 27/02; B29C 43/00; B32B 3/02; B32B 3/04; B32B 3/12; B32B 3/263; B60R 5/00; B60R 5/04; B60R 13/00; B60R 13/011; B62D 25/20
USPC .............. 428/95, 98, 99, 116; 296/39.1, 39.2, 296/39.3, 97.23
See application file for complete search history.

(56) References Cited

U.S. PATENT DOCUMENTS

| | | |
|---|---|---|
| 5,298,694 A | 3/1994 | Thompson et al. |
| 5,502,930 A | 4/1996 | Burkette et al. |

(Continued)

OTHER PUBLICATIONS

Office Action; related U.S. Appl. No. 13/479,974; date of mailing Mar. 20, 2014.

(Continued)

*Primary Examiner* — Brent O'Hern
(74) *Attorney, Agent, or Firm* — Brooks Kushman P.C.

(57) ABSTRACT

A cargo management system including a vehicle load floor having a vehicle component receiving feature is provided. The load floor compartmentalizes a cargo area into an upper compartment and a covered lower compartment. The system includes a first generally planar member having a first depression of a first predetermined depth and a compression-molded, composite, second generally planar member having a second depression of a second predetermined depth. A portion of the second member is locally crushed by press molding to form the second depression. Opposed surfaces of the first and second depressions cooperate to restrain movement of a vehicle component positioned in a cavity defined by the first and second depressions between the first and second members and prevent sudden transfer of vehicle component weight during vehicle acceleration and deceleration.

20 Claims, 2 Drawing Sheets

(56) References Cited

U.S. PATENT DOCUMENTS

| | | | |
|---|---|---|---|
| 5,915,445 A | 6/1999 | Rauenbusch | |
| 5,979,962 A | 11/1999 | Balentin et al. | |
| 6,050,630 A | 4/2000 | Hochet | |
| 6,102,464 A | 8/2000 | Schneider et al. | |
| 6,435,577 B1 | 8/2002 | Renault | |
| 6,537,413 B1 | 3/2003 | Hochet et al. | |
| 6,631,785 B2 | 10/2003 | Khambete et al. | |
| 6,655,299 B2 | 12/2003 | Preisler et al. | |
| 6,659,223 B2 | 12/2003 | Allison et al. | |
| 6,682,675 B1 | 1/2004 | Vandangeot et al. | |
| 6,682,676 B1 | 1/2004 | Renault et al. | |
| 6,720,058 B1 | 4/2004 | Weeks et al. | |
| 6,748,876 B2 | 6/2004 | Preisler et al. | |
| 6,790,026 B2 | 9/2004 | Vandangeot et al. | |
| 6,793,747 B2 | 9/2004 | North et al. | |
| 6,823,803 B2 | 11/2004 | Preisler | |
| 6,843,525 B2 | 1/2005 | Preisler | |
| 6,890,023 B2 | 5/2005 | Preisler et al. | |
| 6,918,625 B2 | 7/2005 | Storto et al. | |
| 6,926,348 B2 | 8/2005 | Krueger et al. | |
| 6,945,594 B1 | 9/2005 | Bejin et al. | |
| 6,981,863 B2 | 1/2006 | Renault et al. | |
| 7,014,259 B2 | 3/2006 | Heholt | |
| 7,059,646 B1 | 6/2006 | DeLong et al. | |
| 7,090,274 B1 | 8/2006 | Khan et al. | |
| 7,093,879 B2 | 8/2006 | Putt et al. | |
| 7,264,685 B2 | 9/2007 | Katz et al. | |
| 7,320,739 B2 | 1/2008 | Thompson, Jr. et al. | |
| 7,399,515 B1 | 7/2008 | Thele | |
| 7,402,537 B1 | 7/2008 | Lenda et al. | |
| 7,419,713 B2 | 9/2008 | Wilkens et al. | |
| 7,628,440 B2 | 12/2009 | Bernhardsson et al. | |
| 7,837,009 B2 | 11/2010 | Gross et al. | |
| 7,909,379 B2 | 3/2011 | Winget et al. | |
| 7,918,313 B2 | 4/2011 | Gross et al. | |
| 7,919,031 B2 | 4/2011 | Winget et al. | |
| 8,117,972 B2 | 2/2012 | Winget et al. | |
| 8,622,456 B2 | 1/2014 | Preisler et al. | |
| 8,690,233 B2 | 4/2014 | Preisler et al. | |
| 2003/0079659 A1* | 5/2003 | Preisler et al. | 108/51.3 |
| 2004/0037995 A1 | 2/2004 | Nicolai et al. | |
| 2005/0189674 A1 | 9/2005 | Hochet et al. | |
| 2006/0255611 A1 | 11/2006 | Smith et al. | |
| 2008/0105866 A1 | 5/2008 | Jeong et al. | |
| 2008/0145635 A1 | 6/2008 | Stoll et al. | |
| 2010/0026031 A1* | 2/2010 | Jouraku | 296/37.16 |
| 2010/0060038 A1 | 3/2010 | Takakura et al. | |
| 2011/0315310 A1 | 12/2011 | Trevisan et al. | |
| 2013/0278002 A1 | 10/2013 | Preisler et al. | |
| 2013/0278003 A1 | 10/2013 | Preisler et al. | |
| 2013/0278009 A1 | 10/2013 | Preisler et al. | |
| 2013/0278015 A1 | 10/2013 | Preisler et al. | |
| 2013/0278018 A1 | 10/2013 | Preisler et al. | |
| 2013/0278019 A1 | 10/2013 | Preisler et al. | |
| 2013/0278020 A1 | 10/2013 | Preisler et al. | |
| 2013/0280469 A1 | 10/2013 | Preisler et al. | |
| 2013/0280472 A1 | 10/2013 | Preisler et al. | |
| 2013/0280473 A1 | 10/2013 | Preisler et al. | |
| 2013/0312652 A1 | 11/2013 | Preisler et al. | |
| 2013/0316123 A1 | 11/2013 | Preisler et al. | |
| 2014/0077518 A1 | 3/2014 | Preisler et al. | |
| 2014/0077530 A1 | 3/2014 | Preisler et al. | |
| 2014/0077531 A1 | 3/2014 | Preisler et al. | |
| 2014/0145465 A1 | 5/2014 | Preisler et al. | |
| 2014/0145470 A1 | 5/2014 | Preisler et al. | |
| 2014/0147617 A1 | 5/2014 | Preisler et al. | |
| 2014/0147622 A1 | 5/2014 | Preisler et al. | |

OTHER PUBLICATIONS

Office Action; related U.S. Appl. No. 13/686,362; date of mailing Mar. 25, 2014.
Office Action; related U.S. Appl. No. 13/523,253; date of mailing Mar. 25, 2014.
Office Action; related U.S. Appl. No. 13/688,972; date of mailing Mar. 28, 2014.
Office Action; related U.S. Appl. No. 13/687,232; date of mailing Mar. 28, 2014.
Office Action; related U.S. Appl. No. 13/689,809; date of mailing Mar. 31, 2014.
Office Action; related U.S. Appl. No. 13/687,213; date of mailing Mar. 31, 2014.
Office Action; related U.S. Appl. No. 13/690,265; date of mailing Mar. 31, 2014.
Office Action; related U.S. Appl. No. 13/762,904; date of mailing Apr. 8, 2014.
Office Action; related U.S. Appl. No. 13/762,800; date of mailing Apr. 8, 2014.
Office Action; related U.S. Appl. No. 13/762,861; date of mailing Apr. 9, 2014.
Office Action; related U.S. Appl. No. 13/690,566; date of mailing Apr. 9, 2014.
Office Action; related U.S. Appl. No. 13/762,832; date of mailing Apr. 11, 2014.
Office Action; related U.S. Appl. No. 13/762,921; date of mailing Apr. 14, 2014.
Notice of Allowance; related U.S. Appl. No. 13/686,388; date of mailing Apr. 15, 2014.
Related U.S. Appl. No. 13/690,566, filed Nov. 30, 2012.
Related U.S. Appl. No. 13/762,921, filed Feb. 8, 2013.
Related U.S. Appl. No. 13/762,956, filed Feb. 8, 2013.
Office Action; related U.S. Appl. No. 13/453,201 (now USPN 8,690,233); date of mailing Nov. 20, 2013.
Office Action; related U.S. Appl. No. 13/523,209 (now USPN 8,622,456) date of mailing Apr. 29, 2013.

* cited by examiner

CARGO MANAGEMENT SYSTEM INCLUDING A VEHICLE LOAD FLOOR HAVING A VEHICLE COMPONENT RESTRAINING FEATURE

CROSS-REFERENCE TO RELATED APPLICATIONS

This application is a continuation-in-part of U.S. patent application entitled "CARGO MANAGEMENT SYSTEM INCLUDING A VEHICLE LOAD FLOOR TO COMPARTMENTALIZE A CARGO AREA" filed Nov. 27, 2012 and having U.S. Ser. No. 13/686,362.

TECHNICAL FIELD

This invention relates, in general, to the field of vehicle cargo management systems which have load floors and, in particular, to such systems having load floors which divide cargo areas into upper and lower compartments.

Overview

The trunk of an automobile or car is typically the vehicle's main storage, luggage or cargo compartment. The use of retainers to retain cargo can prevent or reduce damage to the cargo, the cargo and its occupants during severe vehicle maneuvers by preventing sudden luggage or cargo weight transfer. Some vehicles are fitted with metal grids or guards to retain loose items in case of vehicle collision or during emergency braking and minor crash impacts.

Beyond carrying cargo, the trunk of most passenger vehicles commonly contains various other components often behind or below a load floor. These components may be accessed by the vehicle's occupants or service personnel through hatches in the load floor or by removing carpet and support boards, etc. Typical components include:
- emergency supplies;
- spare tire;
- jack and lug wrench;
- on-board tool kit for di-it-yourself repairs;
- electronics for sound, video, GPS, etc.;
- battery and hybrid energy store;
- fuse boxes;
- CNG/LPG tanks (for bivalent engines); and
- Additional folding, or 'third-row', seating.

Battery pack designs for Electric Vehicles (EVs) are complex and vary widely by manufacturer and specific application. However, they typically all incorporate a combination of several relatively simple mechanical and electrical component systems which perform the basic required functions of the pack.

The actual battery cells can have different chemistry, physical shapes, and sizes as preferred by various pack manufacturers. Each battery pack will invariably incorporate many discrete cells connected in series and parallel to achieve the total voltage and current requirements of the pack. Battery packs for all electric drive EVs can contain several hundred individual cells.

To assist in manufacturing and assembly, the large stack of cells is typically grouped into smaller stacks called modules. Several of these modules will be placed into a single pack. Within each module the cells are welded together to complete the electrical path for current flow. Modules can also incorporate cooling mechanisms, temperature monitors, and other devices. In most cases, modules also allow for monitoring the voltage produced by each battery cell in the stack by a Battery Management System (BMS).

Sandwich-type composite panels including cores have very important characteristics because of their light weight and high strength. Conventionally, such panels are constructed by sandwiching a core having a large number of cavities and have low strength characteristics between two outer layers or skins, each of which is much thinner than the core but has excellent mechanical characteristics.

The prior art discloses a method for making a panel of sandwich-type composite structure having a cellular core in a single processing step. In that method, the panel is made by subjecting a stack of layers of material to cold-pressing in a mold. As shown in FIG. 1, the stack is made up of: at least a first skin made of a reinforced thermoplastics material, a cellular core made of thermoplastics material, and a second skin also made of a reinforced thermoplastics material. The stack may also include one or more external covering layers made of a woven or nonwoven thermoplastic material. The skins may be pre-heated outside the mold or heated inside the mold to a softening temperature.

Such a method is particularly advantageous because of the fact that it makes it possible, in a single operation, to generate cohesion and bonding between the various layers of the composite structure as shown in FIG. 2, and to shape the resulting panel while preserving all of the mechanical properties imparted by the cellular-core, sandwich structure.

Panels of sandwich-type composite structure having a cellular core have rigidity characteristics sufficient to enable mechanical structures subjected to large stresses to be reinforced structurally without making them too heavy. Such panels are in common use in shipbuilding, aircraft construction, and rail vehicle construction.

U.S. patent documents related to the present invention include: U.S. Pat. Nos. 5,298,694; 5,502,930; 5,915,445; 5,979,962; 6,050,630; 6,102,464, 6,435,577; 6,537,413; 6,631,785; 6,655,299; 6,659,223; 6,682,675; 6,793,747; 6,748,876; 6,790,026; 6,682,676; 6,823,803; 6,843,525, 6,890,023; 6,918,625, 6,981,863; 7,014,259; 7,059,646; 7,090,274; 7,093,879; 7,264,685; 7,320,739; 7,402,537; 7,419,713; 7,837,009; 7,909,379; 7,918,313; 7,919,031; 8,117,972; 2006/0255611; 2008/0145635; 2008/0185866 and 2011/0315310.

One problem associated with prior cargo management systems including load floors in the automotive industry is that typically separate cargo management organization and/or restraint subsystems must be provided below the load floor to manage, organize, secure and maintain vehicle components stored therein without damaging the components. Such subsystems also typically require valuable storage space.

Yet another problem associated with the prior art is that load supporting panels must satisfy OEM deflection criteria in an automotive setting. Typical OEM deflection criteria are as follows:
- Max Allowable Deflection Range: 8-15 mm from a load exerting a force on the panel;
- Load Surface Size: 4: Diameter of 10"×10" square;
- Test Temperature: −30 C, ambient, 85 C;
- Surrounding Support: Depends on application, but mainly 4-sided support; and
- Other Requirements: No part damage or permanent set greater than 3 mm.

The term "facing material" refers to a material used to conceal and/or protect structural and/or functional elements from an observer. Common examples of facing materials include upholstery, carpeting, and wall coverings (including stationary and/or movable wall coverings and cubicle wall coverings). Facing materials typically provide a degree of aesthetic appearance and/or feel, but they may also provide a degree of physical protection to the elements that they conceal. In some applications, it is desirable that the facing material provide properties such as, for example, aesthetic appeal (for example, visual appearance and/or feel) and abrasion resistance.

Facing materials are widely used in motor vehicle construction. In the automotive industry, it is common practice to refer to various surfaces as being A-, B-, or C-surfaces.

As used herein, the term "A-surface" refers to an outwardly-facing surface for display of the interior of a motor vehicle. This surface is a very high visibility surface of the vehicle that is most important to the observer or that is most obvious to the direct line of vision. With respect to motor vehicle interiors, examples include dashboards, instruments panels, steering wheels, head rests, upper seat portions, headliners, load floors and pillar coverings.

SUMMARY OF EXAMPLE EMBODIMENTS

An object of at least one embodiment of the present invention is to provide a cargo management system including a vehicle load floor wherein the load floor is sized, shaped and sufficiently rigid to manage, organize, protect, secure and restrain cargo stored beneath the load floor without the need for separate cargo management, organization and/or restraint subsystems which take up valuable storage space.

In carrying out the above object and other objects of at least one embodiment of the present invention, a cargo management system including a vehicle load floor to compartmentalize a cargo area into an upper compartment and a covered lower compartment is provided. The system includes a first generally planar member having a first depression of a first predetermined depth and a compression-molded, composite, second generally planar member having a second depression of a second predetermined depth. The second member has first and second outer layers and a core positioned between the outer layers. The core has a large number of cavities. The outer layers are bonded to the core by press molding. A portion of the second member is locally crushed by the press molding to form the second depression. Opposed surfaces of the first and second depressions cooperate to restrain movement of a vehicle component positioned in a cavity defined by the first and second depressions between the first and second members and prevent sudden transfer of vehicle component weight during vehicle acceleration and deceleration.

The first and second members may have opposed planar surfaces contacting each other wherein the cavity has a height equal to the sum of the first and second depths.

The contacting planar surfaces may transfer a load appearing at a first outer surface of the first outer layer to the first member without substantially changing the height of the cavity.

The core may be a cellular core.
The core may be a thermoplastic core.
The core may be a honeycomb core.
The outer layers may be fiber reinforced.
The second member may have a thickness in a range of 5 to 25 mm.

The outer layers may be thermoplastic layers and the core may be a thermoplastic core.

At least one or both of the outer layers may be a woven outer layer.

Further in carrying out the above object and other objects of at least one embodiment of the present invention, a cargo management system including a carpeted vehicle load floor to compartmentalize a cargo area into an upper compartment and a covered lower compartment is provided. The system includes a first panel having a first depression of a first predetermined depth and a carpeted, compression-molded, composite second panel having a second depression of a second predetermined depth. The second panel includes first and second outer layers and a core positioned between the outer layers. The core has a large number of cavities. The outer layers are bonded to the core by press molding. A portion of the second panel is locally crushed by the press molding to form the second depression. Opposed surfaces of the first and second depressions cooperate to restrain movement of a vehicle component positioned in a cavity defined by the first and second depressions between the first and second panels and prevent sudden transfer of vehicle component weight during vehicle acceleration. The second panel further has a substantially continuous carpet layer bonded to an outer surface of the first outer layer.

The first and second panels may have opposed planar surfaces contacting each other wherein the cavity has a height equal to the sum of the first and second depths.

The contacting planar surfaces may transfer a load appearing at an outer A-surface of the carpet layer to the first panel without substantially changing the height of the cavity.

Yet still further in carrying out the above object and other objects of at least one embodiment of the present invention, a cargo management system including a carpeted, thermoplastic vehicle load floor to compartmentalize a cargo area into an upper compartment and a covered lower compartment is provided. The system includes a first panel having a first depression of a first predetermined depth and a carpeted, compression-molded, composite second panel having a second depression of a second predetermined depth. The second panel has first and second thermoplastic outer layers and a thermoplastic core positioned between the outer layers. The core has a large number of cavities. The outer layers are bonded to the core by press molding. A portion of the second panel is locally crushed by the press molding to form the second depression. Opposed surfaces of the first and second depressions cooperate to restrain movement of a vehicle component positioned in a cavity defined by the first and second depressions between the first and second panels and prevent sudden transfer of vehicle component weight during vehicle acceleration and deceleration. The second panel further has a substantially continuous, thermoplastic carpet layer bonded to an outer surface of the first outer layer.

The first and second panels may have opposed planar surfaces contacting each other wherein the cavity has a height equal to the sum of the first and second depths.

The contacting planar surfaces may transfer a load appearing at an outer A-surface of the carpet layer to the first panel without substantially changing the height of the cavity.

The core may be a cellular core.
The second member may have a thickness in a range of 5 to 25 mm.

The core may be a honeycomb core.
Other technical advantages will be readily apparent to one skilled in the art from the following figures, descriptions and claims. Moreover, while specific advantages have been enumerated, various embodiments may include all, some or none of the enumerated advantages.

BRIEF DESCRIPTION OF EXAMPLE EMBODIMENTS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
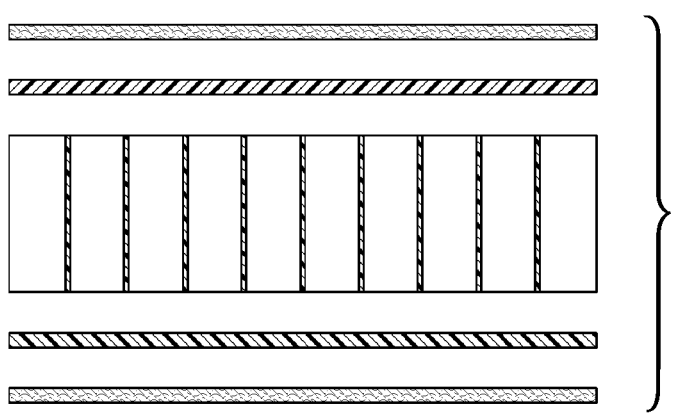
FIG. 1 is a side sectional view showing various separate layers of a prior art stack of thermoplastic-based layers of material.
Figure 2:
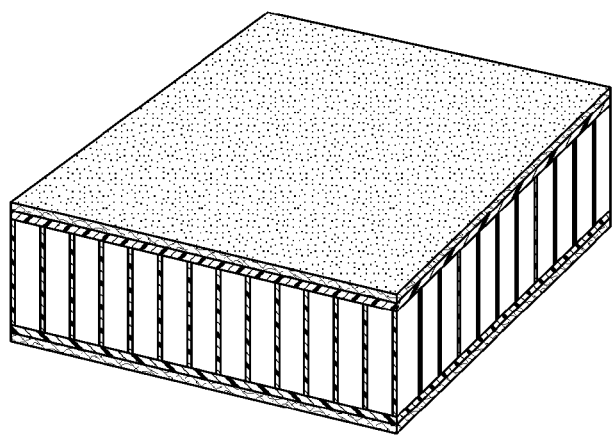
FIG. 2 is a top perspective sectional view of the stack of FIG. 1 after compression molding.
Figure 3:
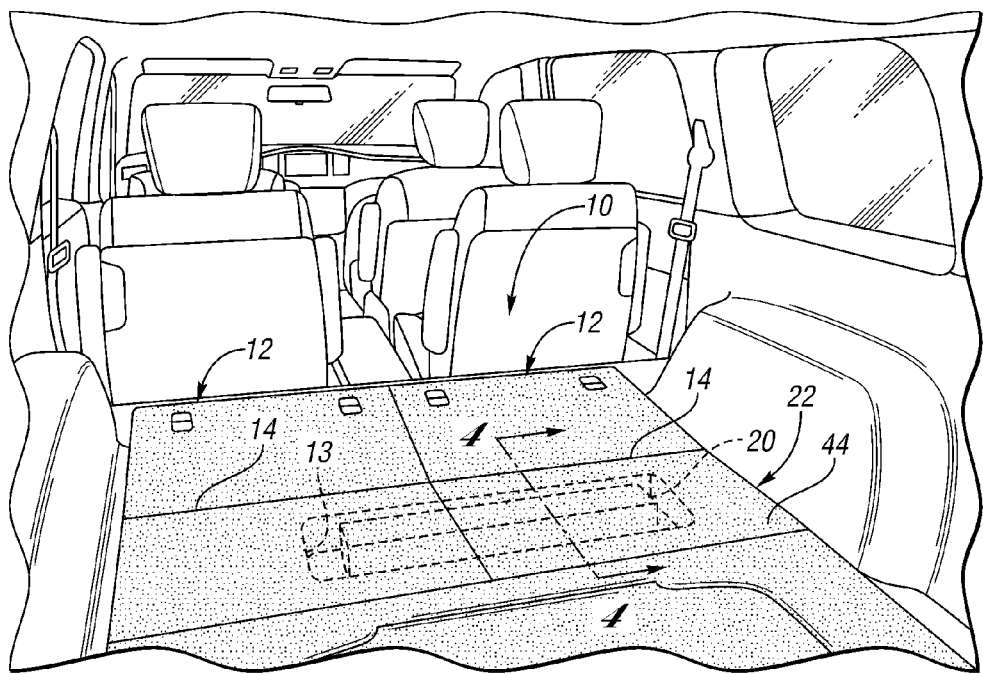
FIG. 3 is an environmental view, partially broken away, of a cargo management system including a vehicle load floor constructed in accordance with at least one embodiment of the present invention.
Figure 4:
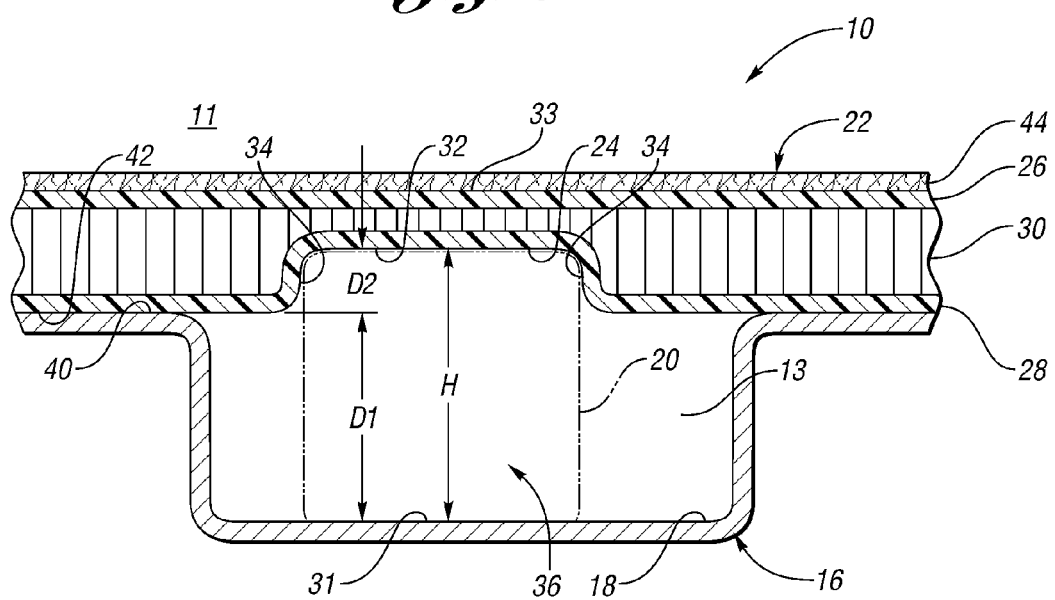
FIG. 4 is a view, partially broken away and in cross section, taken along lines 4-4 in FIG. 3 of the system with a vehicle component, indicated by phantom lines, restrained in a covered lower compartment of a cargo area.

Referring now to FIGS. 3 and 4, an embodiment of a cargo management system including an automotive vehicle load floor, generally indicated at 10, compartmentalizes a cargo area into an upper compartment 11 and a covered lower compartment 13 as shown in FIG. 4. The load floor 10 may include a pair of carpeted, compression-molded, sandwich-type, composite hinged panels, generally indicated at 12. Each panel 12 is typically pivotally connected to the rest of the load floor 10 by living hinges 14.

It is to be understood that the load floor 10 constructed in accordance with at least one embodiment of the present invention may be used in a wide variety of environments besides the automotive vehicle environment of FIG. 3.

The cargo management system includes a first generally planar member, generally included at 16, having a first depression 18 of a first predetermined depth, $D_1$. The planar member 16 may be a metal stamped sheet of material typically used to support one or more vehicle components such as an elongated, rectangular component or components indicated by phantom lines 20, in the lower covered compartment 13 of the cargo area at the rear of the vehicle.

The load floor 10 also includes a compression-molded, composite, generally planar, member or panel, generally indicated at 22. The panel 22 has a second depression 24 of a second predetermined depth $D_2$. The second member 22 includes first and second outer layers 26 and 28, respectively, and a core 30 positioned between the outer layers 26 and 28. The core 30 has a large number of cavities. The outer layers 26 and 28 are bonded to the core 30 by press molding. A portion 33 of the second member 22 is locally crushed by the press molding to form the second depression 24. A bottom surface 31 of the first depression 18 and bottom and side surfaces 32 and 34, respectively, of the depression 24, cooperate to restrain movement of the vehicle component 20 which is shown in FIG. 4 positioned in a cavity, generally indicated at 36, defined by the first and second depressions 18 and 24, respectively, between the first and second members 16 and 22, respectively, and prevent sudden transfer of vehicle component weight during vehicle acceleration and deceleration.

The first and second members 16 and 22, respectively, have opposed planar surfaces 40 and 42 contacting each other about the crushed portion 33. The cavity 36 has a height, H, substantially equal to the sum of the first and second depths, $D_1$ and $D_2$, respectively.

The contacting planar surfaces 40 and 42 transfer a load appearing at a first outer surface of the first outer layer 26 (or at the outer surface of a covering layer 44) to the first member 16 without substantially changing the height, H, of the cavity 36 so as not to damage the component 20.

The member or panel 22 is typically manufactured by providing a stack of material located or positioned within a mold. The stack typically includes first and second reinforced thermoplastic skins or outer layers 26 and 28, respectively, a core having a large number of cavities such as the thermoplastic cellular core 30 disposed between and bonded to the skins 26 and 28 by press molding. The substantially continuous covering or carpet layer 44 made of thermoplastics material covers and is bonded to the first skin 26 which provides a top support surface. The skins 26 and 28 are heated typically outside of the mold to a softening temperature. The mold is preferably a low-pressure, compression mold which performs a thermo-compression process on the stack of materials.

The portion 33 of the composite panel 22 is crushed at a predetermined location simultaneously with the step of applying the pressure to compact and reduce the thickness of the cellular core 30 at the predetermined location to form the depression 24 having a size and shape which corresponds in size and shape to an upper portion of the vehicle component 20 (as indicated by phantom lines) to restrain movement of the vehicle component 20 and prevent sudden transfer of vehicle component weight during vehicle acceleration and deceleration.

The carpet layer 44 may be a resin carpet and the resin may be polypropylene. The carpet layer 44 may be made of a woven or nonwoven material (typically of the carpet type).

The cellular core 30 may be a honeycomb core. In this example, the cellular core 30 has an open-celled structure of the type made up of tubes or a honeycomb, and it is made mainly of polyolefin and preferably of polypropylene. It is also possible to use a cellular structure having closed cells of the foam type.

Each of the skins 26 and 28 may be fiber reinforced. The thermoplastic of the skins 26 and 28, the covering layer 44 and the core 30 may be polypropylene. At least one of the skins 26 and 28 may be a woven skin, such as polypropylene woven skin. Each of the skins 26 and 28 may be reinforced with fibers, e.g., glass fibers, carbon fibers or natural fibers. At least one of the skins 26 and 28 may advantageously be made up of woven glass fiber fabric and of a thermoplastics material.

The core 30 of the panel 22 may have a thickness in the range of 3 to 23 mm and the crushed portion 33 of the carpeted panel 22 may have a thickness in the range of 6 to 18 mm. The depth, $D_2$, of the depression 24 corresponds to different heights of different vehicle components stored in the covered lower compartment 13 of the cargo area.

In one example method of making the panel 22, a stack of material may be pressed in a low pressure, cold-forming mold. The stack is made up of the first skin 26, the cellular core 30, the second skin 28 and the covering layer 44, and is pressed at a pressure lying in the range of $10 \times 10^5$ Pa. to $30 \times 10^5$ Pa. The first and second skins 26 and 28 are preferably pre-heated to make them malleable and stretchable. Advantageously, in order to soften the first and second skins 26 and 28, respectively, heat is applied to a pre-assembly constituted by the stack made up of at least the first skin 26, of the cellular core 30, and the second skin 28. The first and second skins 26 and 28 have a forming temperature lying approximately in the range of 160° C. to 200° C., and, in this example, about 180° C.

Different vehicle components having different sizes and shapes may be stored in different sized and shaped covered lower compartments of the cargo area. By strategically crushing different portions of the panel 22, the panel 22 can receive and retain the different vehicle components.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A cargo management system including a vehicle load floor to compartmentalize a cargo area into an upper compartment and a covered lower compartment, the system comprising:
   a first generally planar member having a first depression of a first predetermined depth; and
   a compression-molded, composite, second generally planar member having a second depression of a second predetermined depth, the second member including first and second outer layers and a core positioned between the first and second outer layers and having a plurality of cavities wherein the outer layers are bonded to the core by press molding and wherein a portion of the second member is locally crushed by the press molding to form the second depression wherein component engaging opposed surfaces of the first and second depressions cooperate to restrain movement of a vehicle component positioned in a cavity defined by the first and second depressions between the first and second members and prevent sudden transfer of vehicle component weight during vehicle acceleration and deceleration without a need for a separate operate cargo management, organization or restraint subsystem beneath the load floor.

2. The system as claimed in claim 1, wherein the first and second members have opposed planar surfaces contacting each other and wherein the cavity has a height equal to the sum of the first and second depths.

3. The system as claimed in claim 2, wherein the contacting planar surfaces transfer a load appearing at a first outer surface of the first outer layer to the first member without substantially changing the height of the cavity.

4. The system as claimed in claim 1, wherein the core is a cellular core.

5. The system as claimed in claim 1, wherein the core is a thermoplastic core.

6. The system as claimed in claim 1, wherein the core is a honeycomb core.

7. The system as claimed in claim 1, wherein the outer layers are fiber reinforced layers.

8. The system as claimed in claim 1, wherein the second member has a thickness in a range of 5 to 25 mm.

9. The system as claimed in claim 1, wherein the outer layers are thermoplastic layers and the core is a thermoplastic core.

10. The system as claimed in claim 1, wherein at least one of the outer layers is a woven outer layer.

11. The system as claimed in claim 10, wherein each of the outer layers is a woven outer layer.

12. A cargo management system including a carpeted vehicle load floor to compartmentalize a cargo area into an upper compartment and a covered lower compartment, the system comprising:
   a first panel having a first depression of a first predetermined depth; and
   a carpeted, compression-molded, composite second panel having a second depression of a second predetermined depth, the second panel including first and second outer layers and a core positioned between the outer layers and having a plurality of cavities wherein the first and second outer layers are bonded to the core by press molding and wherein a portion of the second panel is locally crushed by the press molding to form the second depression wherein component engaging opposed surfaces of the first and second depressions cooperate to restrain movement of a vehicle component positioned in a cavity defined by the first and second depressions between the first and second panels and prevent sudden transfer of vehicle component weight during vehicle acceleration and deceleration without a need for a separate cargo management, organization or restraint subsystem beneath the load floor and wherein the second panel further includes a substantially continuous carpet layer bonded to an outer surface of the first outer layer.

13. The system as claimed in claim 12, wherein the first and second panels have opposed planar surfaces contacting each other and wherein the cavity has a height equal to the sum of the first and second depths.

14. The system as claimed in claim 13, wherein the contacting planar surfaces transfer a load appearing at an outer A-surface of the carpet layer to the first panel without substantially changing the height of the cavity.

15. A cargo management system including a carpeted, thermoplastic vehicle load floor to compartmentalize a cargo area into an upper compartment and a covered lower compartment, the system comprising:
   a first panel having a first depression of a first predetermined depth; and
   a carpeted, compression-molded, composite second panel having a second depression of a second predetermined depth, the second panel including first and second thermoplastic outer layers and a thermoplastic core positioned between the outer layers and having a plurality of cavities wherein the first and second outer layers are bonded to the core by press molding and wherein a portion of the second panel is locally crushed by the press molding to form the second depression wherein component engaging opposed surfaces of the first and second depressions cooperate to restrain movement of a vehicle component positioned in a cavity defined by the first and second depressions between the first and second panels and prevent sudden transfer of vehicle component weight during vehicle acceleration and deceleration without a need for a separate cargo management, organization or restraint subsystem beneath the load floor and wherein the second panel further includes a substantially continuous, thermoplastic carpet layer bonded to an outer surface of the first outer layer.

16. The system as claimed in claim 15, wherein the first and second panels have opposed planar surfaces contacting each other and wherein the cavity has a height equal to the sum of the first and second depths.

17. The system as claimed in claim 16, wherein the contacting planar surfaces transfer a load appearing at an outer A-surface of the carpet layer to the first panel without substantially changing the height of the cavity.

18. The system as claimed in claim 15, wherein the core is a cellular core.

19. The system as claimed in claim 15, wherein the second member has a thickness in a range of 5 to 25 mm.

20. The system as claimed in claim 15, wherein the core is a honeycomb core.

\* \* \* \* \*

UNITED STATES PATENT AND TRADEMARK OFFICE
CERTIFICATE OF CORRECTION

PATENT NO. : 8,808,827 B2  
APPLICATION NO. : 13/762800  
DATED : August 19, 2014  
INVENTOR(S) : Darius J. Preisler et al.

Page 1 of 1

It is certified that error appears in the above-identified patent and that said Letters Patent is hereby corrected as shown below:

In the Claims

Column 7, Line 41, Claim 1:

After "need for a separate"  
Delete "operate"

Signed and Sealed this  
Third Day of February, 2015

Michelle K. Lee  
*Deputy Director of the United States Patent and Trademark Office*